United States Patent [19]

Akiya

[11] Patent Number: 5,847,539

[45] Date of Patent: Dec. 8, 1998

[54] ELECTRICAL CHARGING DEVICE WITH FUNCTION TO PREVENT ERRONEOUS ELECTRICAL CHARGING

[75] Inventor: Makoto Akiya, Saitama, Japan

[73] Assignee: NEC Corporation, Tokyo, Japan

[21] Appl. No.: 895,633

[22] Filed: Jul. 17, 1997

[30] Foreign Application Priority Data

Jul. 17, 1996 [JP] Japan ..................................... 8-187849

[51] Int. Cl.⁶ .................................................. H01M 10/46
[52] U.S. Cl. ............................................ 320/106; 320/110
[58] Field of Search ..................................... 320/106, 110, 320/122, 128, 132, 134, 136, 150, 165, DIG. 12, DIG. 21, 105, 102, 126, 129

[56] References Cited

U.S. PATENT DOCUMENTS 4,628,243  12/1986  Hodgman et al. .
5,355,073  10/1994  Nguyen .

FOREIGN PATENT DOCUMENTS 0 637 119   2/1995  European Pat. Off. .
62-111748   7/1987  Japan .
2 242 083   9/1991  United Kingdom .
2 307 804   6/1997  United Kingdom .

OTHER PUBLICATIONS

"Distinction between rechargeable battery and dry battery", pp. 37–38, IBM Technical Disclosure Bulletin, vol. 37, No. 9, Sep. 1994.

"Battery Type Indicator", pp. 449–450, IBM Technical Disclosure Bulletin, vol. 35, No. 4A, Sep. 1992.

*Primary Examiner*—Edward H. Tso
*Attorney, Agent, or Firm*—Young & Thompson

[57] ABSTRACT

An electrical charging device for preventing an erroneous electrical charging of a non-rechargeable battery includes a battery cell voltage sensing circuit and a switch control circuit for controlling an electrical charging in response to a presence or a non-presence of a battery cell voltage detected by this circuit. When a battery case houses one type of primary batteries, the switch control circuit prevents electrical charging when the voltage is detected, but permits electrical charging when the voltage is not detected. For another type of primary battery, the switch control circuit prevents electrical charging when the voltage is detected and it prevents electrical charging when the voltage is not detected.

14 Claims, 2 Drawing Sheets

ELECTRICAL CHARGING DEVICE WITH FUNCTION TO PREVENT ERRONEOUS ELECTRICAL CHARGING

BACKGROUND OF THE INVENTION

1. Field of the Invention

This invention relates to an electrical charging device to be used in an electronic equipment capable of using both a primary battery cell and a secondary battery cell, in particular, a mobile communication equipment or the like, wherein the electrical charging device automatically determines the type of battery cell loaded in a mobile communication equipment and does not performing an electrical charging operation when the primary battery cell is loaded.

2. Description of the Related Art

Some kind of mobile communication equipment has a battery cell case capable of using a secondary battery cell as an electrical charging battery cell. Then, when a user of the aforesaid mobile communication equipment charges the battery cell, the user directly connects the secondary mobile communication equipment having the battery cell loaded therein to an electrical charging device.

However, in the case that the battery cell case has a structure which can receive either the primary battery cell or the secondary battery cell, there is a possibility that a user of a mobile communication equipment may connect the mobile communication equipment to the electrical charging device while the primary battery cell is loaded in the case. When the primary battery cell is charged an electrical current flows in a reverse direction in respect to the primary battery cell and may cause an accident, such as causing the primary battery cell to explode.

In turn, a gazette of Japanese Utility Model Laid-Open No. Sho 62-111748 discloses an electrical charging device that prevents erroneous electrical charging. This device includes a switching means having a discriminating terminal arranged to be mechanically contacted with a chassis for the battery cell; a switching transistor for use in controlling an electrical charging operation in response to the switching means; and a jack having a movable terminal for use in changing-over between an electrical charging and an electrical discharging of the battery cell. This is constructed such that an electrical charging current is supplied to the battery cell only when a plug is inserted into the jack to cause the movable terminal to be in its released state, and the switching means is closed to be in an electrically conductive state.

However, the aforesaid electrical charging circuit changes the electrical charging and the electrical discharging in response to a contacted state between the battery cell and the discriminating terminal, wherein this circuit is normally operated to perform a mechanical discrimination of the type battery cell installed. Accordingly, if the discrimination terminal is deformed or damaged, it does not become possible to determine the type of battery cell, resulting in that there may occur a problem that the erroneous electrical charging may not be prevented.

SUMMARY OF THE INVENTION

It is an object of the present invention to eliminate the aforesaid problem and provide a highly reliable electrical charging device that electrically discriminates among the types of battery cells loaded in the battery cell case and which does not perform any electrical charging when the primary battery cell is installed.

That is, the electrical charging device having a function to prevent an erroneous electrical charging is provided with a switch control circuit for use in controlling an electrical charging in response to a presence or a non-presence of voltage at a predetermined terminal within the battery cell case. In addition, it is also possible to arrange a battery cell voltage sensing circuit which is connected to a switch control circuit so as to detect a voltage at a predetermined terminal of the aforesaid battery cell case. The switch control circuit can be constructed such that it causes an electrical charging operation to be disabled when a certain voltage is generated at a terminal voltage and further to enable an electrical charging operation to be carried out when no voltage is generated at the aforesaid terminal. At this time, the terminal is connected to the primary battery cell within the battery cell case, but not connected to the secondary battery cell. In addition, similarly, the switch control circuit can be constructed such that the electrical charging-operation can be performed when a certain voltage is generated at the aforesaid terminal voltage and causes the electrical discharging operation to be disabled when no voltage is generated at the aforesaid terminal. At this time, the terminal is connected to the secondary battery cell within the battery cell case and is not connected to the primary battery cell.

Such an electrical charging device constructed as above may discriminate electrically the type of battery cell and prevent an erroneous electrical charging. further, since the discrimination of the type of the battery cell is not carried out through a mechanical contact, but carried out electrically, the aforesaid electrical charging device may attain a high reliability.

BRIEF DESCRIPTION OF THE DRAWINGS

The above and other objects, features and advantages of the present invention will become apparent from the following detailed description when taken in conjunction with the accompanying drawings in which.

DETAILED DESCRIPTION OF THE PREFERRED EMBODIMENT

Figure 1:
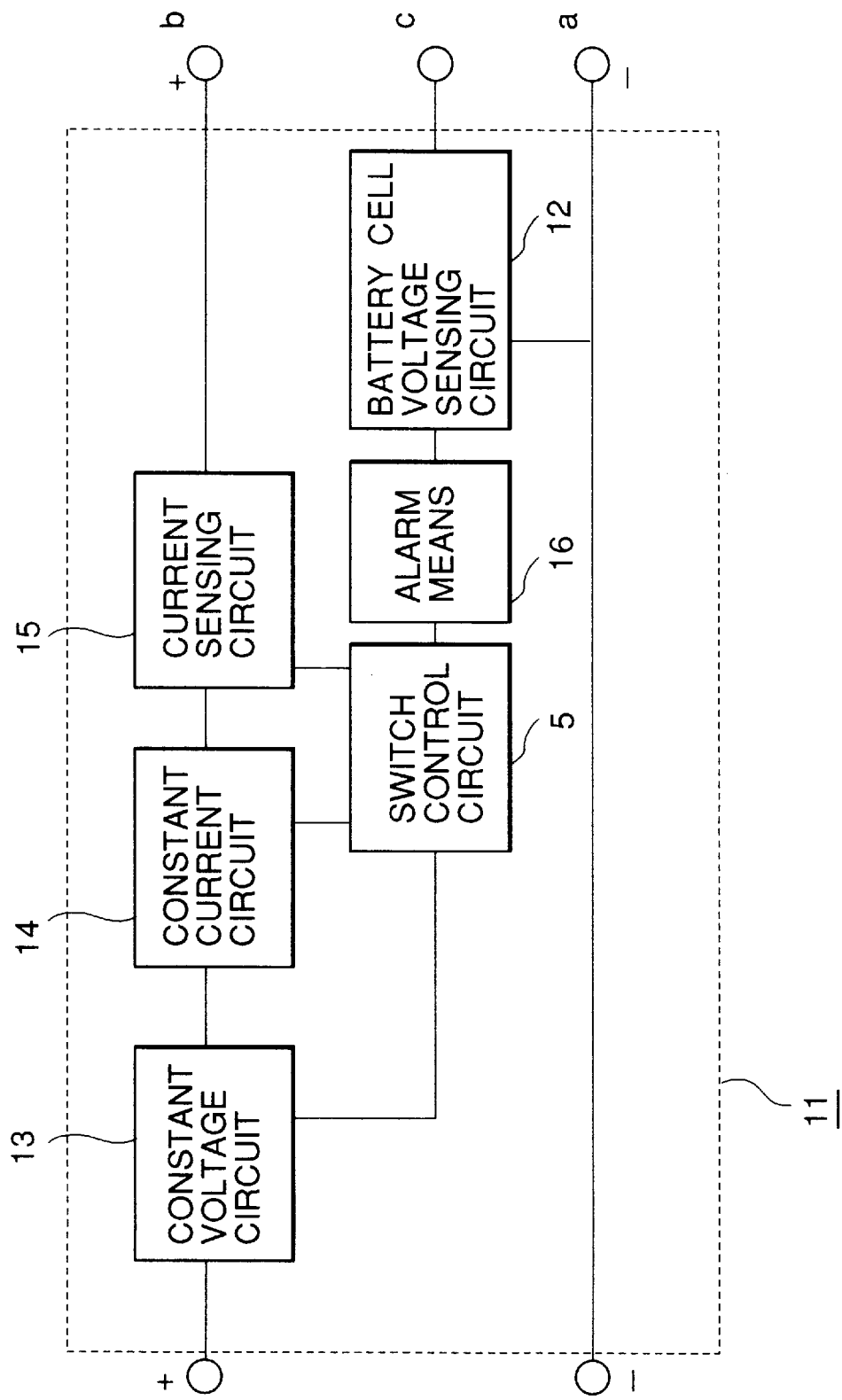
FIG. 1 is a block diagram showing an example of a configuration of an electrical charging device of the present invention.

At first, referring now to the drawings, one preferred embodiment of the present invention will be described. As shown in FIG. 1, an electrical charging device 11 has a switch control circuit 5 connected to a battery cell voltage sensing circuit 12. A constant voltage circuit 13, a constant current circuit 14 and a current sensing circuit 15 comprised of a transistor circuit are connected in series and each of these circuits is connected to switch control circuit 5.

The battery cell voltage sensing circuit 12 is connected to a discriminating terminal (c). A minus-terminal (a) of the two output terminals (a), (b) is connected to the battery cell voltage sensing circuit 12 and a plus-terminal (b) is connected to the current sensing circuit 15. In-addition, constant voltage circuit 13 is connected to an AC power supply through a switching power supply (not shown).

Figure 2:
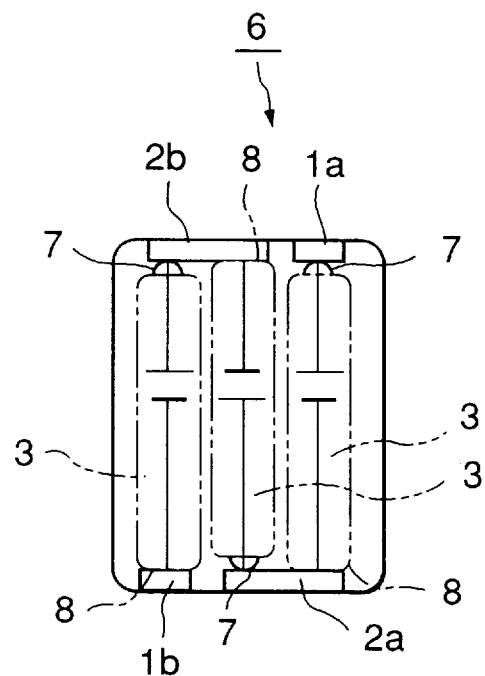
FIG. 2 is a top plan view showing a battery cell case in which some cylindrical battery cells are loaded.

FIG. 2 shows a battery cell case 6 having three cylindrical primary battery cells 3 loaded therein. Within the battery cell case 6 is arranged a common terminal 1a connected to the plus terminal 7 of the right side primary battery cell 3, and also there is arranged a common terminal 1b connected to the minus terminal 8 of the left side primary battery cell 3. In addition, within the battery cell case 6 are installed an exclusive terminal 2a connected to both minus-terminal 8 of the right side primary battery cell 3 and plus-terminal 7 of a central primary battery cell 3, and an exclusive terminal 2b connected to both minus-terminal 8 of the central primary battery cell 3 and plus-terminal 7 of the left side primary battery cell 3.

Figure 3:
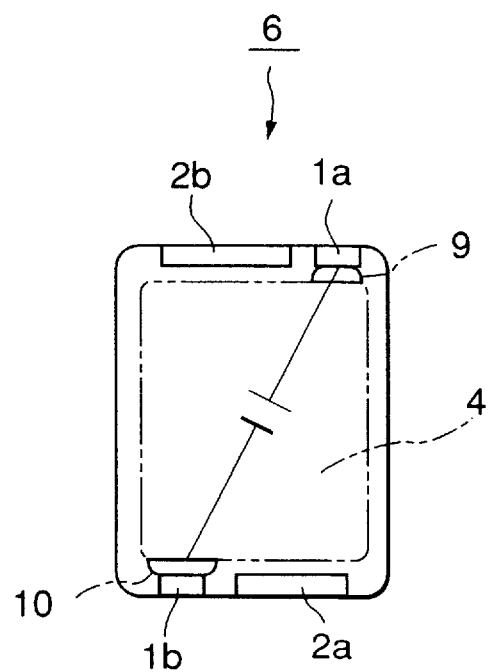
FIG. 3 is a top plan view showing a battery cell case in which a rectangular block-shaped battery cell is loaded.

FIG. 3 is a view for showing a state in which a rectangular block-shaped secondary battery cell 4 is installed in the battery cell case 6. Each of the plus-terminal 9 and the minus-terminal 10 of the secondary battery cell 4 is connected to a common terminal 1a and a common terminal 1b, respectively. However, since a portion of the surface of the secondary battery cell 4 other than the plus-terminal 9 and the minus-terminal 10 is covered by an insulating material, secondary battery cell 4 is not connected to the exclusive terminals 2a, 2b.

In the electrical charging device 11 having the aforesaid configuration, at first, as a user connects a battery cell to a mobile communication equipment, each of the terminals in the electrical charging device 11 is connected to each of the terminals in the battery cell case 6. That is, each of the minus-side terminal (a) and the plus-side terminal (b) of the electrical charging device 11 is connected to each of the common terminals 1a, 1b of the battery cell case 6. In addition, the discriminating terminal (c) of the electrical charging device 11 is connected to the exclusive terminal 2a. Further, the discriminating terminal (c) can also be connected to the exclusive terminal 2b.

In the case that the primary battery cell 3 is installed in the battery cell case 6 as shown in FIG. 2, a slight amount of voltage left at the exclusive terminal 2a and within the primary battery cell 3 can be taken out. As this voltage is detected by the battery cell voltage sensing circuit 12 through the discriminating terminal (c), a control signal indicating the sensing of the voltage is sent to the switch control circuit 5. The switch control circuit 5, upon receiving this control signal, controls a base voltage of a transistor in each of the constant voltage circuit 13 and the constant current circuit 14 so as to prevent the flow of an electrical charging current. Due to this arrangement, the electrical charging current is not erroneously conducted to the primary battery cell 3. In addition, in the case that the secondary battery cell 4 is installed in the battery cell case 6 as shown in FIG. 3, the exclusive terminal 2a or 2b within the battery cell case 6 is not connected to any of the terminals of the secondary battery cell 4. Accordingly, no voltage is generated at the exclusive terminal 2a or 2b at all and so the battery cell voltage sensing circuit 12 does not detect any voltage. The battery cell voltage sensing circuit 12 sends a control signal to the switch control circuit 5, and then the switch control circuit 5 controls the constant voltage circuit 13 and the constant current circuit 14 so as to start an electrical charging operation. The current sensing circuit 15 detects an electrical charging current during its charging period and sends a signal to the switch control circuit 5 as the value becomes a predetermined current value. The switch control circuit 5 receives this signal to determine whether electrical charging is completed and then further the switch control circuit 5 controls the constant voltage circuit 13 and the constant current circuit 14 so as to terminate the electrical charging.

As described above, the electrical charging device of the present preferred embodiment of the present invention performs an automatic discrimination of classification of either the primary battery cell 3 or the secondary battery cell 4 in response to a shape of the battery cell and further controls the electrical charging operation. Due to this fact, a user of the mobile communication equipment can connect the mobile communication equipment to the electrical charging device 11 without acknowledging the type of the battery cells installed in the battery cell case. Then, since the discrimination of the type of battery cell is performed electrically, it is possible to improve in reliability to prevent erroneous electrical charging over that of the prior art electrical charging device in which the battery cell is discriminated with a mechanical means. In this case, a total voltage of the battery cells is 4.8 V (or 4.5V).

The present invention may form a still further configuration which is different from the aforesaid configuration. That is, in opposition to the aforesaid configuration, it is also possible that the switch control circuit 5 may have a function to execute the electrical charging in the case that the battery cell voltage sensing circuit 12 detects a voltage and not to execute the electrical charging in the case that the battery cell voltage sensing circuit does not detect a voltage. In this case, if the primary battery cell has a rectangular block shape and the secondary battery cell has a cylindrical shape, it is possible to utilize the battery cell case 6 having the configuration as shown in FIG. 1 or FIG. 2. In addition, in the case that the primary battery cell 3 has a cylindrical shape and the secondary battery cell 4 is a rectangular block as disclosed in the first example, the discriminating terminal (c) is connected to a terminal of the secondary battery cell as a terminal to be connected only when the secondary battery cell is installed, and it is necessary to have a new arrangement of the exclusive terminal not connected to the primary battery cell when the primary battery cell is installed.

In addition, as the constant voltage circuit 13, the constant current circuit 14, the current sensing circuit 15 and the switch control circuit 5, the well-known circuit configurations can be applied. Further, according to the present invention, in the case that the user erroneously connects the mobile communication equipment having the primary battery cell installed therein to the electrical charging device, no electrical charging current flows in the primary battery cell. However, in the case that the battery cell voltage sensing circuit 12 detects a voltage in the aforesaid preferred embodiment in order to prevent such a useless operation as described above (in the case that the voltage is not detected in response to the configuration of the electrical charging device), it is also possible to provide an alarm means 16, such as an alarm lamp or an alarm sound or the like, which indicates electrical charging is being carried out. To the contrary, it is also possible to have such a configuration as one in which the alarm lamp is turned on when the electrical charging is being carried out.

While the present invention has been described above in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A battery charger comprising;
    a battery case arranged and constructed to house, alternatively, two different types of batteries, namely plural batteries of a first type or one battery of a second type,
    said case comprising two common terminals, a first one of said common terminals for contacting a first terminal of one of the first type batteries and of the second type battery, and a second one of said common terminals for contacting a second terminal of another one of the first type batteries and of the second type battery, when the respective batteries are housed in said case, said case further comprising at least one exclusive terminal for contacting other ones of the first and second terminals of the first type batteries to complete a series connection of the first type batteries between said two common terminals, and for not contacting the first and second terminals of the second type battery, when the respective batteries are housed in said case; and a battery control circuit for controlling charging of the one or more batteries that are housed in said battery case, said battery control circuit comprising a battery voltage sensing circuit connected to one said exclusive terminal for sensing a voltage at said one exclusive terminal, and a switch control circuit connected to said battery voltage sensing circuit for allowing charging of one of the two types of batteries when the one of the two types of batteries is housed in said case and for preventing the charging of the other of the two types of batteries when the other of the two types of batteries is housed in said case, based on the voltage sensed by said battery voltage sensing circuit.

2. The battery charger of claim 1, wherein said switch control circuit is for allowing charging of the second type battery and preventing charging of the first type batteries when a predetermined voltage is sensed by said battery sensing circuit.

3. The battery charger of claim 1, wherein said switch control circuit is for allowing charging of the first type batteries and preventing charging of the second type battery when a predetermined voltage is sensed by said battery sensing circuit.

4. The battery charger of claim 1, wherein said battery case is arranged and constructed to house, alternatively, plural batteries of the first type that are cylindrical primary batteries or one battery of the second type that is a parallelepiped secondary battery.

5. The battery charger of claim 1, wherein said battery case is arranged and constructed to house, alternatively, plural batteries of the first type that are cylindrical secondary batteries or one battery of the second type that is a parallelepiped primary battery.

6. The battery charger of claim 1, further comprising an indicator connected to said switch control circuit for indicating whether battery charging has been enabled.

7. The battery charger of claim 1, further comprising two connections for connecting a source of battery charging power, a constant voltage circuit connected to one of said two connections, a constant current circuit connected to said constant voltage circuit, and a current sensing circuit connected to said constant current circuit and to one of said two common terminals, each of said constant voltage circuit, said constant current circuit, and said current sensing circuit being connected to said switch control circuit.

8. The battery charger of claim 7, wherein the other of said two connections is connected to the other of said two common terminals and to said battery voltage sensing circuit.

9. A battery charger comprising;

a battery case arranged and constructed to house, alternatively, plural cylindrical primary batteries or one parallelepiped secondary battery, said case comprising at least one exclusive terminal for contacting terminals of the primary batteries to complete a series connection of the primary batteries when they are housed in said case and for not contacting terminals of the secondary battery when the secondary battery is housed in said case; and a battery control circuit for sensing a voltage at one said exclusive terminal and for allowing charging of the secondary battery when the secondary battery is housed in said case and for preventing charging of the primary batteries when the primary batteries are housed in said case, based on the sensed voltage.

10. The battery charger of claim 9, said case further comprising two common terminals, a first one of said common terminals for contacting a first terminal of one of the primary batteries and of the secondary battery, and a second one of said common terminals for contacting a second terminal of another one of the primary batteries and of the secondary battery, when the respective batteries are housed in said case.

11. The battery charger of claim 10, further comprising two connections for connecting a source of battery charging power, wherein one of said two connections is connected to one said two common terminals and to a battery voltage sensing circuit in said battery control circuit.

12. A battery charger comprising;

a battery case arranged and constructed to house, alternatively, plural cylindrical secondary batteries or one parallelepiped primary battery, said case comprising at least one exclusive terminal for contacting terminals of the secondary batteries to complete a series connection of the secondary batteries when they are housed in said case and for not contacting terminals of the primary battery when the primary battery is housed in said case; and a battery control circuit for sensing a voltage at one said exclusive terminal and for allowing charging of the secondary batteries when the secondary batteries are housed in said case and for preventing charging of the primary battery when the primary battery is housed in said case, based on the sensed voltage.

13. The battery charger of claim 12, said case further comprising two common terminals, a first one of said common terminals for contacting a first terminal of one of the primary batteries and of the secondary battery, and a second one of said common terminals for contacting a second terminal of another one of the primary batteries and of the secondary battery, when the respective batteries are housed in said case.

14. The battery charger of claim 13, further comprising two connections for connecting a source of battery charging power, wherein one of said two connections is connected to one said two common terminals and to a battery voltage sensing circuit in said battery control circuit.

* * * * *